(12) United States Patent
Rosenfield et al.

(10) Patent No.: US 7,918,419 B2
(45) Date of Patent: Apr. 5, 2011

(54) ROCKET EJECTION DELAY APPARATUS AND/OR METHOD

(75) Inventors: Gary C. Rosenfield, Cedar City, UT (US); Robert A. Rosenfield, Henderson, NV (US)

(73) Assignee: RCS Rocket Motor Components, Inc., Cedar City, UT (US)

( * ) Notice: Subject to any disclaimer, the term of this patent is extended or adjusted under 35 U.S.C. 154(b) by 1296 days.

(21) Appl. No.: 11/488,201

(22) Filed: Jul. 17, 2006

(65) Prior Publication Data

US 2010/0237197 A1    Sep. 23, 2010

Related U.S. Application Data (60) Provisional application No. 60/699,462, filed on Jul. 15, 2005.

(51) Int. Cl.
*B64D 17/72*    (2006.01)
(52) U.S. Cl. ........................................ 244/150
(58) Field of Classification Search ........... 244/122 A, 244/122 AE, 139–141, 149–152; 102/202.12, 102/266
See application file for complete search history.

(56) References Cited

U.S. PATENT DOCUMENTS

| | | | |
|---|---|---|---|
| 3,248,873 A | | 5/1966 | Pase |
| 3,311,330 A | * | 3/1967 | Hofferberth et al. ......... 244/141 |
| 3,486,330 A | | 12/1969 | Edman |
| 3,664,133 A | | 5/1972 | Iwanciow et al. |
| 3,677,010 A | | 7/1972 | Fink et al. |
| 3,700,192 A | * | 10/1972 | Pleasants et al. ............. 244/139 |
| 3,721,193 A | | 3/1973 | Piester |
| 3,787,013 A | | 1/1974 | McKenzie, Sr. |
| 4,057,206 A | * | 11/1977 | Duncan et al. ................ 244/147 |
| 4,158,322 A | | 6/1979 | Hardesty |
| 4,232,843 A | | 11/1980 | Clark et al. |
| 4,355,577 A | | 10/1982 | Ady et al. |
| 4,448,374 A | * | 5/1984 | Duncan ......................... 244/150 |
| 4,493,240 A | | 1/1985 | Norton |

(Continued)

FOREIGN PATENT DOCUMENTS

CA        1147593 A       6/1983

(Continued)

OTHER PUBLICATIONS

Loki Research Rocket Motors & Accessories, http://lokisearch.com/products.asp, retrieved from the internet on Jan. 8, 2009.

(Continued)

*Primary Examiner* — Galen Barefoot
(74) *Attorney, Agent, or Firm* — Peter B. Scull; Kristina M. Kalan; Berenbaum Weinshienk PC (57) ABSTRACT

An ejection delay system, apparatus and/or method including an electronic ejection delay system having an ignition device; a power source connected to the ignition device; and, a flight parameter sensor switch electrically connected to the power source to initiate the provision of power from the power source to the ignition device; the electronic ejection delay system being disposed in some implementations in a housing system including a housing; a forward closure for closing the top end of the housing; and, an aft closure for closing the aft end of the housing. Also disclosed is a method for ejecting a rocket recovery system in flight; including sensing a parameter associated with flight; and, initiating deployment of a recovery system.

7 Claims, 6 Drawing Sheets

U.S. PATENT DOCUMENTS

| | | | |
|---|---|---|---|
| 4,573,316 A | | 3/1986 | Carrier et al. |
| 4,574,700 A | | 3/1986 | Lewis |
| 4,792,903 A | * | 12/1988 | Peck et al. .............. 244/122 AE |
| 5,031,537 A | | 7/1991 | Taylor |
| 5,123,355 A | | 6/1992 | Hans et al. |
| 5,212,946 A | | 5/1993 | Hans et al. |
| 5,309,712 A | | 5/1994 | Mund, Jr. |
| 5,570,573 A | | 11/1996 | Bonnelie |
| 5,825,667 A | * | 10/1998 | Van Den Broek ............ 244/150 |
| 6,058,697 A | | 5/2000 | Smith et al. |
| 6,079,202 A | | 6/2000 | Cesaroni et al. |
| 6,471,160 B2 | * | 10/2002 | Grieser ......................... 244/139 |
| 6,685,140 B2 | * | 2/2004 | Carroll ......................... 244/139 |
| 6,711,890 B2 | | 3/2004 | McGuire |
| 7,073,752 B2 | * | 7/2006 | Voronka et al. ............... 244/152 |
| 2004/0163564 A1 | * | 8/2004 | Sutcliffe ...................... 102/266 |

FOREIGN PATENT DOCUMENTS

DE  2318306 F  10/1974

OTHER PUBLICATIONS

Loki Research, Instructions for Use (2 pages) and Product Specifications (2 pages), Nov. 18, 2010.

* cited by examiner

ROCKET EJECTION DELAY APPARATUS AND/OR METHOD

CROSS-REFERENCE TO RELATED APPLICATIONS

This application is related to and claims priority from the U.S. Provisional application, No. 60/699,462, filed Jul. 15, 2005, and incorporates herein the teachings thereof.

BACKGROUND

Numerous rocket ejection and recovery systems have been proposed and/or are currently in use. Generally, rocket recovery systems such as those used with model or hobby rockets typically employ a parachute fastened to the rocket housing, the parachute often being deployed through the use of a pyrotechnic charge which ejects the parachute out from its initial disposition within the rocket housing. The parachute then deploys and provides for a safe landing of the rocket which allows for recovery of the entire rocket assembly.

Some of these prior, conventional systems may nevertheless be saddled with some drawbacks, including either complicated mechanisms and/or electronics or controlled explosive material issues, the controlled explosive materials usually being consumable ignition and/or delay mechanisms which are controlled for safety by, for example, the United States Bureau of Alcohol Tobacco Firearms and Explosives (ATF) and/or the United States Department of Transportation (DOT). Accuracy in delay control is another potential issue with many prior delay mechanisms. An appropriate delay before deployment of the parachute is preferable such that the parachute is not either deployed too' early, as when the rocket is still accelerating, or too late, after the rocket has begun re-accelerating under the force of gravity toward the earth.

Conventional electronic devices designed to ignite rocket ejection charges have been typically stand-alone units that have been somewhat cumbersome and unwieldy to use, and typically also require consumable pyrotechnic devices to initiate the ejection charge. These pyrotechnic devices are coming under increasing government (e.g., ATF and/or DOT) scrutiny and control, and may soon require federal licenses to purchase and store. Altimeters and radio controls have also been used for parachute deployment.

SUMMARY

Described herein are ejection delay systems, apparatuses and/or methods including an electronic ejection delay system having an ignition device; a power source connected to the ignition device; and, a flight parameter sensor switch electrically connected to the power source to initiate the provision of power from the power source to the ignition device; the electronic ejection delay system being disposed in some implementations in a housing system including a housing; a forward closure for closing the top end of the housing; and, an aft closure for closing the aft end of the housing. Also disclosed is a method for ejecting a rocket recovery system in flight; including sensing a parameter associated with flight; and, initiating deployment of a recovery system.

DESCRIPTION OF THE DRAWINGS

In the drawings:

FIG. 1, which includes sub-part FIGS. 1A and 1B, provides partially cross-sectional views of a portion of a rocket (see particularly FIG. 1A), and the interior parts of an ejection delay module (see FIGS. 1A and 1B) hereof;

DETAILED DESCRIPTION

The presently-described implementations of novel delay ejection mechanisms, apparatuses and/or methods generally include an electronic delay system which may typically include a reusable means for igniting the charge, here, typically glow plug or spark plug or a like electronically activatable device for ignition of a charge of a combustible material such as black powder. The glow plug may be charged by the electronic system, and thus heated to thereby ignite the combustible material which upon ignition quickly generates gases and pressure which thereby causes the ejection of the parachute recovery system from the rocket. As described in further detail below, a gravitational force sensor, also referred to as a G-force sensor, and/or a timer may be used to initiate the charging of the glow plug. Such a device may thus provide for more substantially accurately and/or precisely timing the delay between a rocket motor burnout and the firing of a parachute ejection charge.

In a primary implementation, the delay and ejection electronics may be combined into/onto a rocket motor forward closure component which may thus also be referred to at times as an electronic forward closure. The device may thus involve packaging to conveniently interface with many conventional model or hobby rocket designs such as those reloadable motor casings available from AeroTech (RCS Rocket Motor Components, Inc., Cedar City, Utah), Dr. Rocket (Reloadable Systems LLC, Pahrump, Nev.) and Rouse-Tech Monster Motors (Rouse-Tech, San Jose, Calif.). Thus, with packaging and/or an appropriate delay period, whether by time or by sensed conditions, such as G-force, or acceleration, or air pressure measurement, the apparatuses and/or methods hereof may be adapted to and/or adjusted within wide ranges that permit ejection delay modules hereof to be used with virtually any conceivable rocket motor and rocket vehicle combinations.

Figures 1A, 1B:
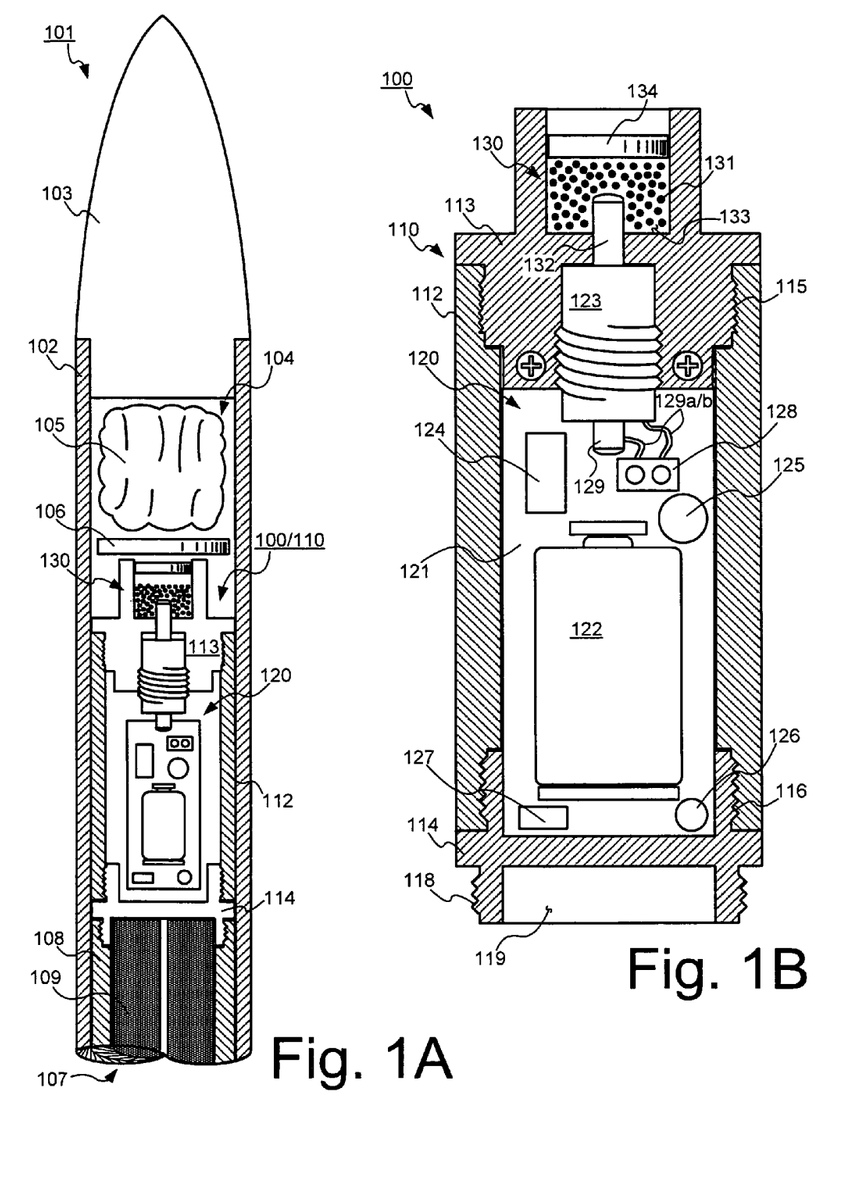

In one detailed exemplar implementation, an ejection delay system or module hereof may be mounted within a rocket as shown in FIG. 1, see particularly, subpart FIG. 1A thereof. An ejection delay system 100 is shown separately in FIG. 1B, and as incorporated within a rocket 101 in FIG. 1A. As will be readily understood, the rocket 101 may include a rocket housing 102, typically a hollow cylindrical member, with an inserted but separable nose cone 103 at and projecting from the top end of the housing 102. Also disposed within the forward or top end of the housing 102 may be a recovery system, generally designated 104, typically including a parachute 105 and perhaps some insulative separation material 106, here shown simply as a disk, though this may be such as a wadding, or other device or material. Other unshown parts of the recovery system might include, inter alia, a parachute cord as connected to the rocket housing 102 and/or the nose cone 103. At or toward the opposing, or aft end of the housing 102 would be, inter alia, the propellant system 107 which as is at least partially shown in FIG. 1A may include a propellant housing 108 and a propellant load or grain or grains 109 disposed within the propellant housing 108. Other aft end components which are not shown here may include the rocket nozzle or nozzles and/or rocket flight control fins, and/or a propellant ignition system, inter alia.

The delay system 100 may in a bare sense include merely the functional elements of an electrical subsystem 120 and/or the combustible subsystem 130, both described below, however these may be disposed within a rocket to perform the functions described herefor below. Otherwise, a delay system 100 may be disposed as and/or may include a separately or discretely packagable ejection delay mechanism or module 110 as shown in FIG. 1A and, more discretely in FIG. 1B. The device or module hereof may alternatively be referred to as a recovery module, or recovery deployment module, inter alia. As described herein, the module 110 may include a housing 112, also typically, but not necessarily, a hollow cylindrical member, with a top end or forward closure member 113 and a lower or aft end closure member 114. As shown in FIG. 1, housing 112 and the forward and aft closures 113, 114 may be detachably connectable to each other in a secure fashion so that the components to be contained therewithin are secure during use, but may be removed for replacement, inspection or otherwise between uses. To this end, the respective internal ends of the housing 112 and corresponding external surfaces of the respective closure members 113, 114 may be matingly threaded as at 115 and 116 such that these parts may be screwed into secure closure positions. Other securing/closing approaches may alternatively be provided. In this way, a secure, substantially closed component housing module may be provided. Note, the exterior, typically cylindrical, surfaces of the closure members 113, 114, and/or one or both of the exterior ends of housing 112, may be knurled (not shown) to assist with manual opening and/or closing of these threaded, screw-type mechanisms.

Aft closure member 114 may further include a set of external threads 118 (or other engagement means) for removably connecting to the forward open end a propellant housing 108, see FIG. 1A. Thus, when connected to a propellant housing 108 in this manner, the closure 114 may then act to close or thus as the front closure of the propellant chamber of the rocket 101. Thus, the closure member 114 may act not only as the aft closure of the ejection delay module but also substantially simultaneously as the forward closure of the propellant chamber/module. In this way then, when the entire ejection module is connected as shown in FIG. 1A, the entire ejection module may be considered as acting as the forward closure of the propellant chamber/module. Note, such a mounting of such an ejection delay system/module to the front or forward closure of a propellant chamber is in contradistinction to many conventional electronic deployment systems which may have been located in the forward payload chamber, usually above the parachute with electrical wires extending therefrom back to the ejection charge. Note further that the aft end closure member 114 hereof may have a well 119 defined therein as shown in FIG. 1B for receiving the propellant grain(s) 109 as shown in FIG. 1A.

FIGS. 1A and 1B also show, at least schematically, an electronic subsystem 120 which may be used herewith. In one broad form, such a subsystem 120 may include a substrate, here, a circuit board 121; a power source, here a battery 122 and an electrically activated ignition device, here a glow-plug 123. Minimally, the battery 122 provides power to the glow-plug 123 to ignite the combustible material, here black powder, smokeless powder, or Pyrodex 131 in the combustion sub-system 130. Though a substrate/circuit board 121 may not be necessary, as when wires may be used for the connection of the power to the glow-plug, it may be desirable in situations where one or more additional circuit components may be connected to the electrical circuitry (see e.g., FIGS. 4 and 5, described further below), and/or for providing a structure for supporting one or more of the battery 122, the glow-plug 123 or other circuit components.

Indeed, as to some other electronic circuit components which may be used herein/herewith, the electrical subsystem 120 may further include, in some detailed implementations, a switch to initiate the distribution of power from the power source 122 to the ignition device 123. A schematic representation of such a switch is shown in FIG. 1B as switch element 124. The switch may be manually driven, or may be time or sensor driven, as for example a sensor switch which senses a certain force, such as an accelerometer or a gravitational or "G" sensing switch which may be adjustable or pre-set to sense a certain acceleration or G force, such as, arbitrarily, 2 or 3 G's. In rocket examples, 2 or 3 G's may represent a liftoff of the rocket, thus, a 2 or 3 G-force may provide significant indication to the electronic subsystem of a particular initiation event. Such a sensing may occur or be set for a period of time, or may occur until the particular threshold is no longer met, as for example, after the preset limit of a 2 or 3 G-force threshold is no longer experienced by the sensor switch. The parametric sensation (e.g., the 2 or 3 G-force) may then trigger by other electronics, as for example, a timer. An exemplar timer is schematically shown as element 125 in FIG. 1B. If such a timer is used, the timer may also be adjustable and/or preset, which may be for example ten (10) seconds (or anywhere between about one (1) second and about one minute or about a very long period of minutes). The expiration of such a timing period may then, through other electronic circuitry provide for current to flow from the power source to the ignition device, e.g., the glow plug 123 (a current amplifier may be used in some instances to ensure sufficient heating of the glow plug) which, being disposed in intimate contact with an ejection charge, then ignites the ejection charge. Greater accuracy of deployment compared to conventional systems can be found. Accuracy may in many cases be within about one (1) second or better depending upon the particular electronics chosen and/or used.

Other potentially usable electronics also shown in FIG. 1B include an indicator LED 126 and a programming switch 127, inter alia. An LED 126 can be used to indicate electrical continuity in the circuit, and/or that appropriate minimum power is being provided to the circuitry in order to be active to provide sufficient power to the ignition device, and/or as an indication that the glow plug is not burned out. Moreover, an LED 126 can further be used with a programming switch 127 to program the timer 125 and/or G-switch 124 if used. This depends of course on the choice of electronics; a more detailed example is provided below. Lastly, a terminal block 128 is shown in FIG. 1B which is shown through leads 129a and 129b connection to the electrical ignition device 123. A connection post 129 provides for either a positive or negative connection to the terminal block 128, and the flat lower face of the device 123 provides the opposite negative or positive connection. The terminal block 128 is connected through the circuit board 121 and other electronics to the power supply 122 to convey appropriate power to the ignition device 123 at the appropriated time.

As introduced above, the ignition system is connected to the combustible subsystem 130 to provide for igniting the combustible material 131 thereof. A filament 132 from the ignition device 123 is disposed sufficiently close to or even in contact with the combustible material 131 to ignite the combustible material 131 when the filament 132 is sufficiently activated by the ignition device 123 and the circuitry of the electronic system 120. The combustible material 131 may be one of a variety of types, including in no-limiting examples, black powder, smokeless powder and Pyrodex. The combustible subsystem 130 further includes a well 133 defined in the upper closure member 113 of the ejection delay module/system 110/100, and an ejection cap or disk 134 to cover and contain the combustible material 131. Of course, the cap 134 is only temporarily disposed as such a cover member; it will be blown out of the well 133 when the combustible material is ignited.

Figure 2:
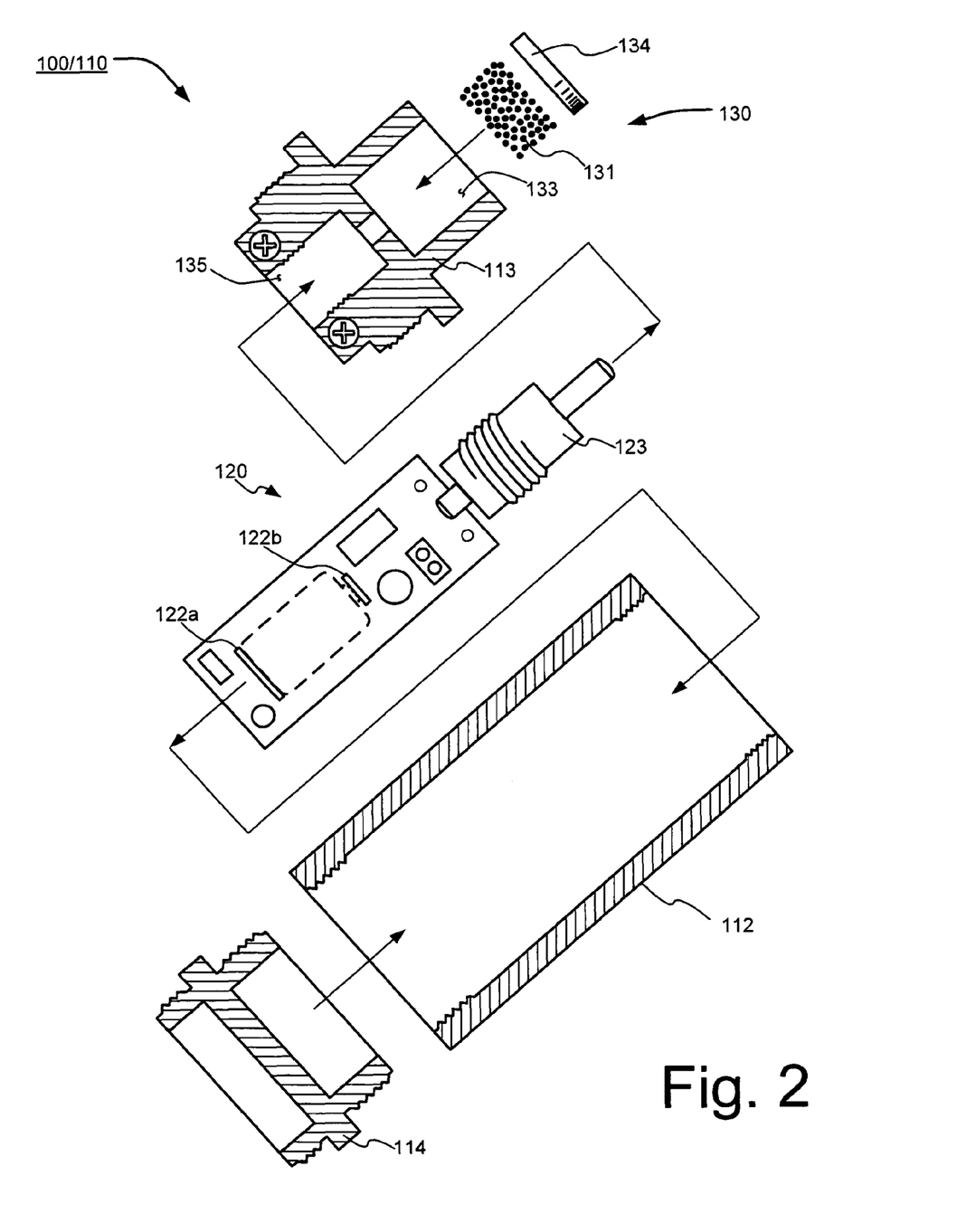
FIG. 2 is an exploded, partially cross-sectional view of an ejection delay module hereof.

In assembly of a system/module 100/110, the representation of FIG. 2 may be instructive. The electrical/electronic components of an electrical system 120 may be attached/affixed to a circuit board 121, though it may be that a battery 122 and/or the ignition device 123 may be attached at later times. For example, the battery 122 may be made easily replaceable by use of a battery receptacle, identified by reference numerals 122a and 122b in FIG. 2. Also, it may be that the ignition device 123 would be inserted in the aperture 135 of the forward closure member 113 before being connected to the circuit board/substrate 121. Note, filament 132 may have its own aperture, size-wise, in the closure member 113, and communicative with the well 133. In any case, then, the circuit board/substrate 121 may be connected to the forward closure 113 and/or inserted in the housing 112. In some implementations, the substrate 121 may be connected to the forward closure 113 by screws or by other attachment mechanisms or means; e.g., by glue or epoxy. Otherwise, the substrate 121 may be made to be secure within the housing 112 and thus, not necessarily connected to the forward closure 113. In either case, the attachment of the aft closure member 114 and the insertion of the combustible material 131 and the ejection cap 134 in the well 133 may complete the assembly of the module 110. It may be noted that the either or both of these may be the latter steps in that it may be preferable, one, to use the aft closure device 114 as a forward closure of a propellant chamber (see FIG. 1A) prior to incorporation within or as a part of an ejection module 110; or two, to keep the combustible material 131 away from the ignition device 123 until the last possible moment before actual use, as a safety measure.

Figure 3:
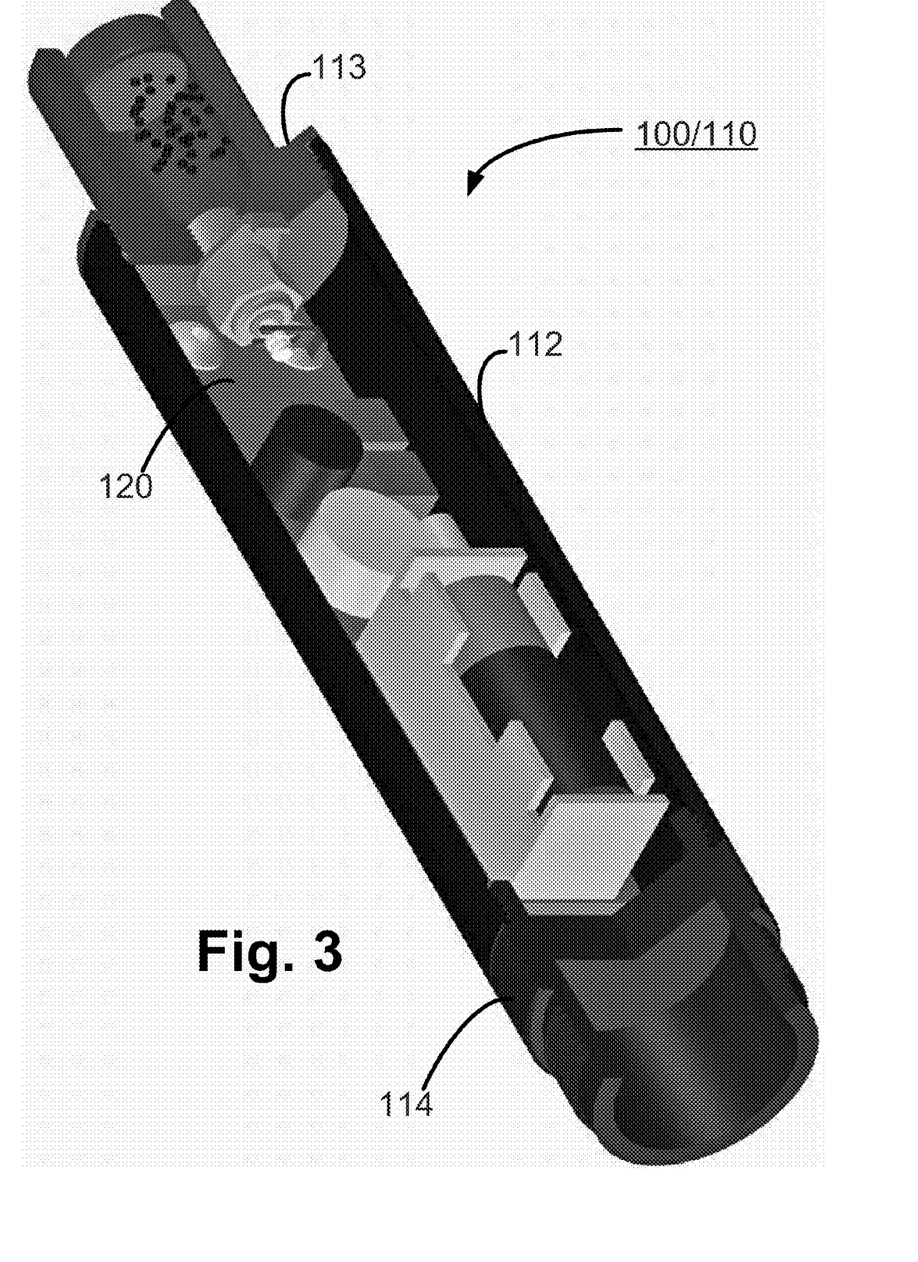
FIG. 3 is an isometric, partially cut-away view of an ejection delay module hereof.

FIG. 3 provides another view of an assembled ejection delay module 110. An electrical subsystem 120 is shown as it would be disposed within a housing 112 enclosed between an aft closure 114 and a forward closure 113. Note, the electrical components shown in FIG. 3 are only schematically represented, and may thus represent a variety of alternative embodiments according to the presently-described innovations.

Figure 4:
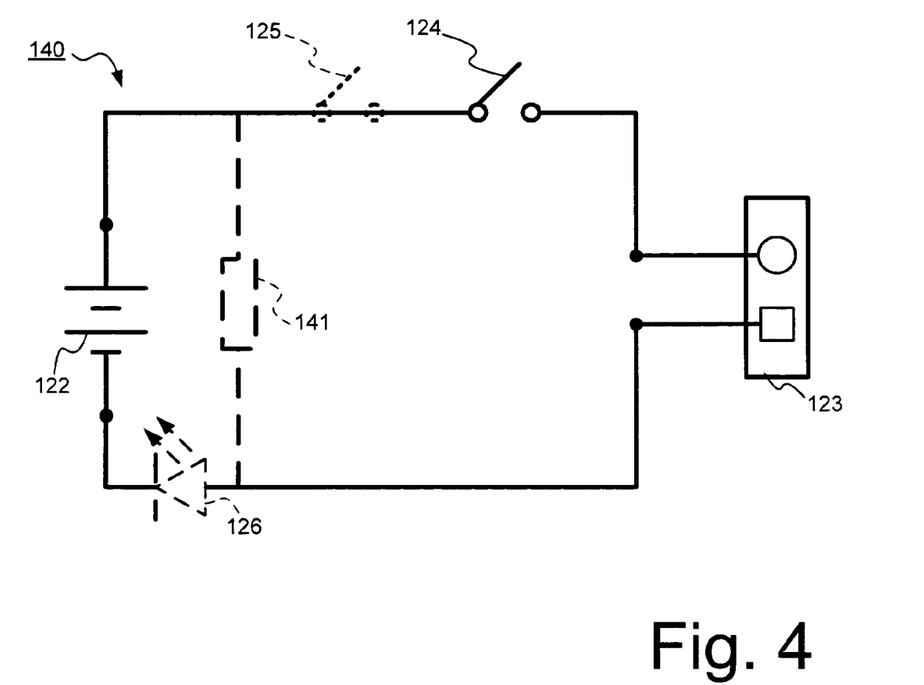
FIGS. 4 and 5 show alternative electrical schematics which may be used herewith; and, FIG. 6 provides a flow chart of a use according hereto.
Figure 5:
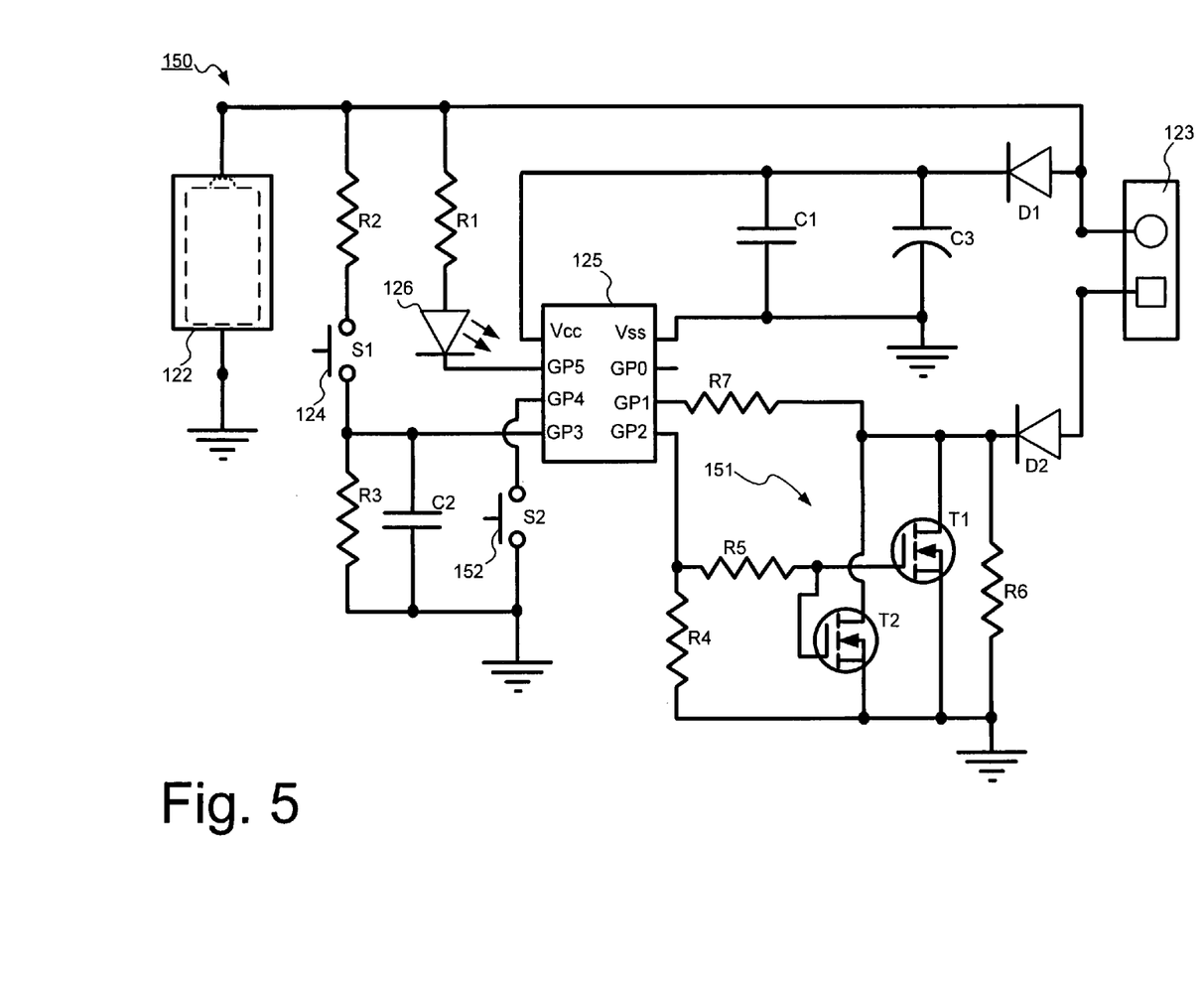

A few exemplar circuits for achieving the ejection of the recovery parachute or the like according hereto are shown in FIGS. 4 and 5, provided that these exemplars are not intended to limit the scope of hereof. In FIG. 4, for example, a bare circuit 140 is provided to demonstrate one or more primary functionalities hereof. In circuit 140, a power source 122 is connected in a circuit to a load, here an ignition device 123. A switch 124 is interposed between the power source and the load so that when the appropriate circumstances activate the switch 124, then a sufficient voltage is applied to the load to activate ignition. In one basic such instance, when a G-force switch may be used, and the G-force has dropped below a certain threshold, as when the rocket motor has reached burnout, and no further propellant is left to be burned, then, the switch may be closed to activate the ignition. In an alternative, an additional switch 125 may also be used. In one such example, an additional switch may also be a G-force switch, such a switch being activated upon the initial reaching of a liftoff G-force, as of 2 G's, with the other switch then activated upon the reduction to the burnout G-force, as below 2 G's. It may be noted that some G-force switches could perform both these functions; i.e. being activated in one direction (open or closed, depending upon whether the switch is a normally open type or normally closed) upon reaching an initial preset G-force above, say at or above 2 G's, and then reacting in the opposite direction (closed or open) when the G-force reduces below the desired threshold. Practically, though, a further circuit modification would be likely for use of such a switch, due to the initial at rest, below threshold G-force to be experienced in addition to the liftoff and burnout G-forces. A third state is then needed or some other circuit element to deal with the three states so that power is provided only at the burnout phase, not initially, pre-flight, nor during liftoff and full power flight.

Thus, in another embodiment, one sensor switch 124 may be a G-force sensor, and the other may be a timer switch 125 so that, in one such implementation, a G-force sensor switch 124 may be activated when the flight G-force, e.g., 2 G's is reached, this may then trigger a pre-set timer 125 to close the circuit to power up the load/ignition device 123, as for example may be useful when the burnout time can be calculated through knowledge of the type and quantity of propellant used. In a variation, a timer could similarly be set to start after reaching the burnout G-force, e.g., below the 2 G (or other) non-flight acceleration.

A further alternative additional functionality is presented in FIG. 4 in the LED 126 (shown in dashed lines) which might be used as here to shown when the circuit is activated, as for example in test purposes (without being loaded with combustible material 131), or if used with a short circuit impedance 141, may be a battery indicator showing the battery is sufficiently charged to operate the circuit; and/or to indicate electrical continuity and/or to indicate that the ignition device/glow plug is not burned out.

A further alternative circuit example is shown in FIG. 5; this exemplar circuit 150 also having a power source 122, an ignition load 123, and a plurality of circuit elements including a G-force switch 124. An LED 126 is also shown. Also included, however, are a microcontroller 125 which may include therewithin a timer and timer switch (if discretely existent) (neither shown here), and a programming switch 152 amongst a variety of other circuit elements. In brief, the microcontroller 125 operates to receive a variety of inputs and provide certain programmed or programmable outputs. Primarily, the microcontroller 125 is powered on at the Vcc input pin, and connected to ground via the Vss output pin. Power is thus provided by the power source 122 via diode D1 as conditioned by capacitors C1 and/or C3. Power is similarly applied through LED 126 to and through the microcontroller on pin GP5. Note, this may provide for simply showing battery/power connection; thus, a live circuit, and/or may be used for programming as further described below.

Two other information/voltage input pins, GP3 and GP4 are shown adjacent the switching circuitry of the circuit 150. The G-force or accelerometer sensor switch 124 is shown connected to GP3. Here, the G-force sensor switch is a normally open switch which closes upon sensing the pre-set G-force level. Non-limitative example G forces used herewith may be 2 G's, or 2.1 G's. Then, when this threshold is met, e.g., soon after liftoff, the switch 124 closes and a corresponding voltage or signal is sent to the microcontroller 125 via input pin GP3. The microcontroller may have been programmed to first wait for an initiation signal, and then wait again, until that signal is no longer provided, as here, where the threshold of less than the preset G force will again be reached upon/after burnout of the rocket propellant. This may then be a signal for the microcontroller to initiate another event, as directly activating ignition circuitry via output pins GP1 and/or GP2, the ignition circuitry generally designated by the reference numeral 151, which would thereby provide sufficient power to the ignition device 123. Or, another event, as for example the timing by a timer of a pre-set time period, may be begun upon the appropriate signal from the G-force sensor 124. Then, after the expiration of the pre-set period, e.g., 10 seconds, the microcontroller would provide the appropriate outputs via GP1 and/or GP2 to the ignition circuitry 151 to provide for appropriate ignition current flow to and through the load/ignition device 123.

One further feature offered by a circuit such as circuit 151 may be in the programming ability. As an example in FIG. 5, the LED 126 on the GP5 input pin may be on the input side of a counter within the microcontroller 125 with the pushbutton programming switch 152 on the output side of the same counter circuit. In such a fashion, the microcontroller may be capable of counting the length of time that a pushbutton switch 152 is manually depressed (or in some implementations, the number of times a pushbutton switch 152 is pushed), and the LED may be correspondingly lit for the duration of the depression of the switch (or with each push) to provide verification to the user the time of the delay desired. In this way; a user can program the number of seconds the user would like to have the microcontroller wait after burnout (i.e., opening of G-force switch 124) or initiation (i.e., closing of the G-force switch 124), before activating the ignition circuit 151 through outputs GP1 and/or GP2.

Some non-limiting specific examples of the components useful in a circuit 150 may include use of: a PIC12F675 microcontroller 125 from Microchip Corporation, Chandler Ariz.; diodes, D1 as an MA748 from Matsushita, Japan, and D3 as a CMSO4 from Toshiba, Japan; and transistors, T1 and T2 as IRF7311 Hexfet® Power Mosfets from International Rectifier, El Segundo, Calif. Sample size ratings for the capacitors in FIG. 5 include: C1 at 0.1 g; C2 at 1.0 g; and C3 at 330 g. Sample ohm sizes for the resistors include: R1 330; R2 4.7 k; R3 33 k; R4 100 k; R5 330 k; R6 33 k; and R7 4.7 k. The battery may in some instances preferably be either a Duracell or Sanyo CR123 and the glow plug may be a Fox Standard Long, from the Fox Mfg. Co., Fort Smith, Ark.

Exemplars of general and more detailed user steps and/or instructions in a variety of implementations may include the following.

A general process of use may include the operations of: sensing a parameter associated with flight, and initiating deployment of recovery system. These operations are shown schematically in the method 160 of FIG. 6 as respective operations 162 and 164. Note, operation 164 may include either or both of a direct deployment of the recovery system, or a timed or otherwise configured delay in deployment. And, in a primary form, the parameter sensed in operation 162 may be an acceleration or gravitationally-related force, or G-force, which when initially sensed at a certain threshold, e.g., 2 G's, may then initiate the system hereof. Thus, in one form, the sensing of the threshold G-force in operation 162 may start a timed delay in operation 164 which may start at the time of sensing of the threshold G-force, e.g., at or just after vehicle liftoff, and end at a time pre-set by the user, at which point, the igniter for the deployment system may then be fired. If a timing only system after such an initial G-force sensing is used, then the motor burn time should be added to the delay time setting to accurately set the expected coast delay since timing will start at liftoff.

Figure 6:
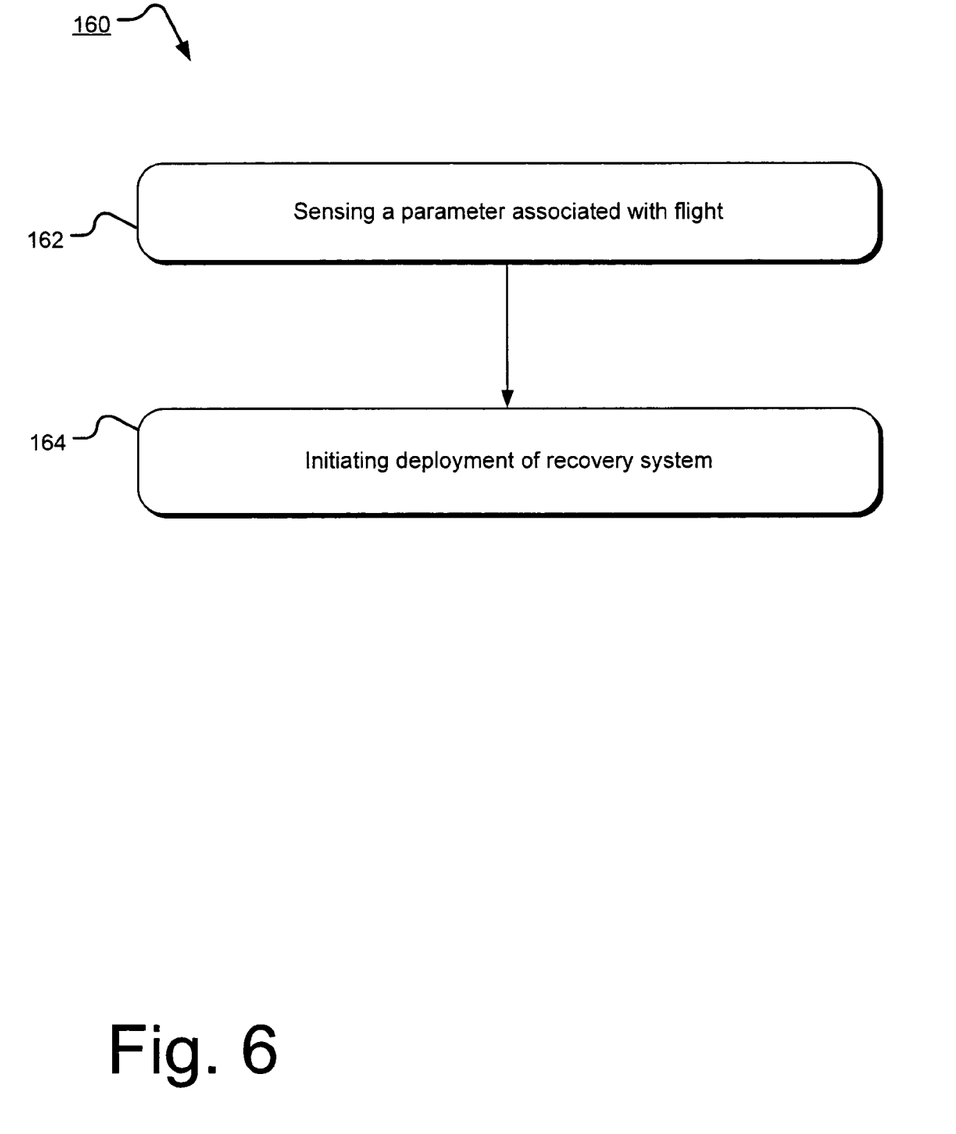

In another variation, it may be that the operation 162 involves the sensing of a reduction of G-force below a threshold and that this is what may initiate the deployment sequence of operation 164. In such variations, at or after motor burnout, this reduced G-force sensation may typically occur when the rocket experiences a deceleration back toward zero, or at least below the liftoff and/or flight value, which may again, in many examples be established in the range of about 2 G's. Thus, after burnout, a G-force sensor could sense when the acceleration has sufficiently been reduced, as below the desired threshold, to then either directly fire the deployment of the recovery system (with a zero or substantially zero time delay after burnout), or initiate a timed delay after burnout to the firing of the deployment of the recovery system. Thus, a programmed time period after burnout may be used. In still a further variation hereof, one or more G-force sensors may be used, first to sense the initiation of flight by the sensation or experiencing of a G-force larger than a threshold to thus arm the ejection delay system, then use of the same or another sensor to sense the reduction of the G-force sensation below a threshold, whether of the same threshold or a different threshold, higher or lower. Then, the second sensation could trigger either the direct deployment of the recovery system or trigger the timer, if used, to count-down to a delayed recovery system deployment.

Note, in any of these implementations, it may be that the circuitry will await a minimum period of G-force sensation, as for example, awaiting an uninterrupted acceleration of the threshold force, e.g., 2 g's, for more than a time period of, for example 0.2 seconds. Thus, at rocket liftoff, the arming or timing phase of the ejection delay system will await the sensing of an uninterrupted acceleration of 2 g's for more than 0.2 seconds. If the acceleration is not continuous or sufficient for more than 0.2 seconds, the arming or timing phase will not be initiated, or otherwise stop and be reset. The system may then await the next appropriately long duration of sensing of acceleration.

In other variations, different flight parameters may be sensed in operation 162 to arm or otherwise initiate the further controls of the ejection delay system hereof. An example is an air pressure sensation, by an air pressure sensor. Thus, an air pressure sensor may be element 124 in FIGS. 4 and/or 5, and this sensor may similarly be used to measure a flight parameter whether of increased (or decreased) speed or acceleration, or of ambient air pressure, to then upon reaching a threshold, activate, as in operation 164 the recovery deployment sequence. Still further liftoff or flight parameters could be measured and used in addition or alternative to those described here.

In a still further detailed process of use, a first step of prepping an ejection delay module for use, may include the operations of: programming, setting or other selection of the parameter threshold(s) and/or delay time, arming the ejection delay module and then assembling the complete device including placing the ejection delay module in the rocket.

As introduced above, programming may include the following operations. First, it may be noted that the ejection closure member and circuit board assembly would have to be removed from the ejection delay housing; this may involve unscrewing the forward member from the housing. It may also be prudent to ensure that the ejection closure is not loaded with black powder or other ignition material at this point during preparatory phases of operation.

In some implementations, as introduced, the user would hold down the program button next to the LED as the battery is inserted. The LED may then light to confirm battery insertion. When the LED has thus been lit, the user may release the program button. At that point the ejection delay electronic subsystem may be waiting to be programmed. The user may then depress the program button and hold it in depressed position for the duration desired for which the time delay is to be set (e.g., for a 12 second delay, the button should be held down for 12 seconds and then released). With a circuit such as that in FIG. 5, the LED may then be programmed to light again while the button is being depressed. The user may then release the program button. The LED may then be programmed to flash to indicate the number of seconds programmed to confirm the delay time (in the 12 second delay example, one such circuit may report a single flash for the digit '1', a pause, and then two flashes for the digit '2'; where, on the other hand, a 10 second delay, may instead be reported as a single flash for the digit '1', a pause, and then ten flashes for the digit '0'). It may further be that such a circuit may report in such a fashion repeatedly periodically until the user may turn the timer off by removing the battery. In some implementations, such as that shown in FIG. 5, this programmed time delay may be retained in non-volatile memory so it may be continually maintained even with the power off, until the user reassigns/re-programs a new time delay value. In some implementations, it may be desirable to then remove the battery from the holder (e.g., for a period of at least about 5 seconds) until the module is intended to be armed for use or testing.

To arm and/or test the module, the battery may be into the holder, if it had been removed from the programming step. (Note, it may be that the circuit would be better suited to not have the program button depressed during this battery installation.) The ejection delay module may now be in flight ready mode. The LED may be programmed to blink out the time delay once (as in the programming operations above), and/or it may then be that the LED will be programmed to illuminate (e.g., dimly) to indicate continuity, in which case, if the LED does not light after blinking out the time delay, there is not sufficient circuit continuity and the ejection charge will not fire. If continuity is not present, the ignition device/glow plug may be the reason, so it may need to be removed, tested, and replaced if necessary.

A test sequence may be performed prior to flight; note it is suggested to perform a function test described below when first using the ejection delay module and whenever it has not been used for a while, preferably before each flight and preferably without an ejection charge. Flight acceleration may be simulated by briskly swinging the ejection delay module in about a ⅓ circumference arc with the glow plug end facing toward the user. When the acceleration is discontinued in this manner, thereby simulating motor burnout to be detected, the timer would then count down for the pre-programmed delay time and then fire the glow plug brightly. After the plug is fired, the LED may then be programmed to blink slowly to indicate that a "launch" was detected and the firing sequence was executed. If the glow plug appears to glow dimly or not at all, the battery may need replacement with a fresh battery of a type such as those specified herein. A re-test may then be called for.

Final preparation for flight may then include the following recommended flight preparation procedure. The combustible material should now be loaded in the ejection charge well; however, it may be recommended that the battery first be removed from the battery holder to ensure safe loading. Then, the desired/required amount of black powder (e.g., FFFFG black powder) should be dispensed into the ejection charge well of the ejection module forward closure member. (Typical amounts may vary from 0.7 grams for 1.8"-2.6" diameter rockets, to 1.4 grams for 3"-4" diameter rockets, to 2.1 grams for 5"-6" diameter rockets.) A paper disc (e.g. ¾"-1" diameter) and/or plastic ejection charge cap (e.g., ½" diameter; available from AeroTech, part no. 0406-4) may then be loaded into the ejection charge well of the ejection forward closure member and depressed thereinto until it stops against the ejection charge. With care, the battery may then be re-inserted, and the module armed as described above. This should take place at the launch pad, for safety reasons. Once armed, the LED should be verified as glowing steadily before proceeding. Again, it could be that the LED is first programmed to flash, in sequence, a report for the corresponding delay time setting. (Note, such flashes would typically be rapid for convenience and not to represent the actual one-second intervals programmed therein.) The actual timing intervals may be tested as described above. Once armed, the ejection delay module is ready for use and will stay ready until the igniter is fired. Caution is strongly advised when handling an armed ejection delay module.

The rocket motor may be loaded for flight. Note, the aft closure of the ejection delay module may have previously been connected to the forward end of the propellant chamber, or this may be a part of the ejection delay module assembly process described here. Otherwise, it could be that the aft closure and the housing of the ejection delay system are pre-connected to the propellant chamber. Ultimately, these steps are not required in any particular order; however, safety concerns may suggest closing certain chambers, such as the propellant chamber and/or the ejection charge chamber, as soon as possible after loading a propellant or combustible material thereinto. Then, it may be that arming the ejection delay system is one of the last steps before completing the assembly. In any case, to complete the ejection delay housing may be screwed onto the forward threads of the ejection module aft closure. The ejection module forward closure and circuit board assembly are also screwed into place, the circuit board being inserted in the open forward end of the ejection module housing. The ejection delay module top closure is screwed into the top of the housing by holding the closure and rotating the housing. Then, once attached to the rocket motor, the ejection delay module with the rocket motor attached may then be installed into the rocket airframe, see FIG. 1A. Then, once installed as a completed assembly of a rocket motor and ejection delay module into the rocket vehicle, it may be ensured that the rocket motor is secured within the rocket motor mount tube using positive mechanical means of retention, to prevent the motor from being ejected from the rocket during recovery system deployment. The rocket may then be installed on the launch pad and then launched in a preferably safe manner.

Thus, an ejection delay system, mechanism and/or module hereof, also referred to as a recovery deployment module may include a variety of uses and/or advantages. For example, this device may be designed for attachment to a reloadable rocket motor. It may replace the delay timing grain often used with such motors and offers a convenient, precise electronic delay before recovery ejection. It may be completely self-contained with electronics and batteries. It may operate with a forward closure containing a glow igniter and a cavity for the ejection charge. When the rocket has achieved an acceleration of at least 2 G's, e.g., the ejection delay module may be made to start a timing phase, or after first accelerating to 2 G's and then decelerating below 2 G's, then, a timing phase may be started. At completion of timing, the igniter will fire. The delay can be set from zero seconds to a very large number of seconds, e.g., over 6000 seconds (or other arbitrary amounts depending upon the electronics chosen) in one second (or smaller or larger) increments by means of a selector switch. The ejection delay module may in some implementations be 3" long and operate in a 4" housing. A forward closure screws into the top of the housing. The bottom of the ejection delay module has a threaded adapter to attach to the motor. Weight of the electronics module may be minimal. Prepping the ejection delay module may involve setting the delay time, applying power and then arming. The setting of the delay time may be verified visually. The electronics module is then placed in its housing and the forward closure is then screwed into the housing. Ejection material may then be added. Note, no pre-installation is necessary and it may be armed at the time of launch. Typically, this device will be a single event deployment (although multiple deployments are also possible) attached for simplicity to the motor. In an implementation, the device or module will have a threaded end which will mate with and screw onto the existing threaded ends of existing motors, particularly, reloadable motors. Other attachment means, bayonets, snaps or alternatives may also be used, particularly dependent upon the types of forward motor closures available to which this may be connected. In other implementations, the module is more permanently built onto and is thus a part of a forward bulkhead or closure component, as for example in a single use rocket with a substantially permanently attached propellant chamber forward closure.

Thus, the ejection delay module may be permanently disposed attached to or detachably attachable to a rocket motor (typically, a reloadable rocket motor). Similarly, the ejection delay module may be formed such that the ejection delay housing and either the aft closure or the forward closure are integrally formed therewith (as by having the housing and an aft closure or a forward closure integrally molded, or machined from the same piece of material), or substantially permanently or semi-permanently connected thereto. E.g., two discrete parts may be separately formed then brought together and affixed in substantially or semi-permanent fashion. Moreover, the top closure of the ejection delay module may be separate from but connectable to the ejection charge well or cavity. Thus, the ejection charge may be in a separate housing which is connectable either permanently or semi-permanently, or detachably attachable to the forward closure of the ejection delay housing.

Thus, in one form, the ejection delay system is a modularized form, either self-contained, and/or attached to or detachably attachable to a rocket motor. In this fashion, a particularly re-usable rocket motor form, e.g., with re-loadable propellant grains, can be readily re-used with a readily connectable ejection delay system. A modularized, enclosed housing ejection delay system is readily useable in such a fashion. Thus, attachability of an ejection delay system to a rocket motor is one alternative desirable feature. Note, such a feature could be independent from other features, or may be used with other features of the present disclosure. Indeed, a reusable ignition device may or may not be used in such an implementation. Rather, an electric match or a remote control firing means could alternatively be used as well in/with a rocket motor with an attachable ejection delay system. Note, staging may incorporate such a feature; i.e., an attachable ejection delay system, with or without reusable ignition (likely a non-reusable ignition would be used for the staging prior to and/or including the recovery system ejection).

Thus, in another form, a reusable ignition device is incorporated, and this feature may or may not be used with other features such as the ejection system to the rocket motor. A reusable ignition system such as that offered by a glow plug or spark plug may provide the benefit of good ejection control without necessarily being structurally defined by or between other parts such as the rocket motor. So long as the reusable ignition, i.e., the glow plug is operable to ignite the ejection charge, it may or may not need to be disposed attached to the rocket motor.

Further features and/or benefits may include the following. This mechanism may include a reusable ejection charge ignition device (e.g., a standard type model airplane engine glow plug). No consumable government-regulated initiators are necessary, rather, it replaces the delay timing grain normally used with these motors and offers a convenient, precise electronic delay before recovery ejection. Forward burn-through failure mode may be eliminated. The ejection charge holder may be integrated. Time delay may be calculated from rocket motor burnout. Time delay may be selectable in one-second increments. There may be a virtually unlimited time delay range with no compromising delay times. Short-circuit protection (deliberately short-circuiting the output is not recommended) may be provided. It may be light weight, small in size with a long battery life. A built-in continuity check may be provided. Accidental activation may be protected against. Reverse polarity protection (inserting the battery backward will not harm the EFC or fire the glow plug) may be provided. Motor closure adapters may be available to fit a wide variety of Aero-Tech, Dr. Rocket and Rouse-Tech motors with a simpler design to eliminate the need for two parts (forward delay spacer and delay o-ring).

From the foregoing, it is readily apparent that new and useful embodiments of the present systems, apparatuses and/or methods have been herein described and illustrated which fulfill numerous desiderata in remarkably unexpected fashions. It is, of course, understood that such modifications, alterations and adaptations as may readily occur to the artisan confronted with this disclosure are intended within the spirit of this disclosure which is limited only by the scope of the claims appended hereto.

What is claimed is:

1. An ejection delay module attached to a rocket motor, the ejection delay module comprising:
    a housing system including:
        a housing;
        a forward closure for closing the top end of the housing; and,
        an aft closure for closing the aft end of the housing; and,
    an electronic ejection delay system including:
        an ignition device;
        a power source connected to the ignition device; and,
        a flight parameter sensor switch electrically connected to the power source to initiate the provision of power from the power source to the ignition device, wherein the ignition device is a glow plug for ignition of a charge of combustible material.

2. An ejection delay module according to claim 1 wherein the forward closure is connectable to an ejection charge well.

3. An ejection delay module according to claim 1 wherein the forward closure has an integral ejection charge well.

4. An ejection delay module according to claim 1 wherein the aft closure is also a propellant chamber forward closure.

5. An ejection delay module according to claim 1 wherein one of the forward closure and the aft closure is integral with the housing.

6. An ejection delay module according to claim 1 wherein one of the forward closure and the aft closure is integral with the housing through one or more of integral molding, machining from the same piece and substantially permanently affixing one of the forward closure and the aft closure is integral to the housing.

7. An ejection delay module according to claim 1 wherein the electronic ejection delay system is adapted to be disposed in a rocket between the rocket propellant chamber and the recovery system ejection charge.

\* \* \* \* \*